(12) United States Patent
Murukesan et al.

(10) Patent No.: US 11,566,631 B2
(45) Date of Patent: Jan. 31, 2023

(54) TURBOCHARGER COMPRESSOR WHEELS HAVING A BI-LAYERED COATING AND METHODS FOR MANUFACTURING THE SAME

(71) Applicant: Garrett Transportation I Inc, Torrance, CA (US)

(72) Inventors: Palaniappa Murukesan, Bangalore (IN); Philippe Renaud, Sanchey (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/301,169

(22) Filed: Mar. 29, 2021

(65) Prior Publication Data

US 2022/0307516 A1 Sep. 29, 2022

(51) Int. Cl.
*F04D 29/32* (2006.01)
*F04D 21/00* (2006.01)
(Continued)

(52) U.S. Cl.
CPC ......... *F04D 29/285* (2013.01); *F04D 17/025* (2013.01); *F05D 2220/40* (2013.01); *F05D 2240/303* (2013.01)

(58) Field of Classification Search
CPC ........ F04D 29/324; F01D 21/045; F01D 5/18; F05D 2230/90; F05D 2220/40
See application file for complete search history.

(56) References Cited

U.S. PATENT DOCUMENTS

| 5,441,024 | A | * | 8/1995 | Wietig | ...................... | F01L 3/04 |
| | | | | | | 29/888.46 |
| 6,754,954 | B1 | * | 6/2004 | Decker | .................... | B21K 3/04 |
| | | | | | | 29/889 |

(Continued)

FOREIGN PATENT DOCUMENTS

IT 201900007758 A1 12/2020

OTHER PUBLICATIONS

A. Hadipour et al (2015) Comparison of H—Cr single layer and Ni—P/H—Cr duplex coating, Surface Engineering, 31:9, 666-672.

*Primary Examiner* — Long T Tran
(74) *Attorney, Agent, or Firm* — Quinn IP Law

(57) ABSTRACT

A compressor wheel for a turbocharger includes a hub portion defining a rotational axis and a plurality of blades extending radially outward from the hub portion. Each blade of the plurality of blades includes a leading edge, the leading edges of each blade of the plurality of blades forming an inducer portion of the compressor wheel. Each blade of the plurality of blades further includes a trailing edge, the trailing edges of each blade of the plurality of blades forming an exducer portion of the compressor wheel. The inducer portion is positioned longitudinally forward from the exducer portion along a rotational axis with respect to a flow of air along the compressor wheel. The hub portion and the plurality of blades include a substrate metal. The substrate metal of the hub portion and the plurality of blades has coated directly thereon a first coating layer including electroless nickel-phosphorous. The first coating layer has coated directly thereon a second coating layer including hard chrome. The second coating layer has a thickness that is greatest at the inducer portion, with the thickness of the second coating layer decreasing rearward towards the exducer portion such that the thickness of the second coating layer is about zero microns at or longitudinally forward of the trailing edges of each blade of the plurality of blades.

9 Claims, 4 Drawing Sheets

(51) Int. Cl.
*F01D 5/18* (2006.01)
*F04D 29/28* (2006.01)
*F04D 17/02* (2006.01)

(56) References Cited

U.S. PATENT DOCUMENTS

| | | | | |
|---|---|---|---|---|
| 2010/0098532 | A1* | 4/2010 | Diemer | F04D 29/685 |
| | | | | 29/889.22 |
| 2010/0148129 | A1* | 6/2010 | Kosowsky | H05K 1/0257 |
| | | | | 977/773 |
| 2011/0002067 | A1* | 1/2011 | Allen | G11B 5/73921 |
| 2011/0229338 | A1* | 9/2011 | Voong | F04D 29/284 |
| | | | | 416/241 B |
| 2014/0178637 | A1* | 6/2014 | Rajagopalan | C23C 14/0605 |
| | | | | 427/249.7 |
| 2014/0186174 | A1* | 7/2014 | Malfa | F01D 9/026 |
| | | | | 416/235 |
| 2014/0339699 | A1* | 11/2014 | Arvin | H01L 21/76885 |
| | | | | 257/738 |
| 2015/0118090 | A1* | 4/2015 | Lachey | F04B 39/005 |
| | | | | 428/639 |
| 2015/0132539 | A1* | 5/2015 | Bailey | C23C 28/042 |
| | | | | 427/523 |
| 2017/0009350 | A1* | 1/2017 | Myllymaki | C25D 5/50 |
| 2017/0283220 | A1* | 10/2017 | Ding | C23C 18/31 |
| 2018/0045215 | A1 | 2/2018 | Arai et al. | |

* cited by examiner

TURBOCHARGER COMPRESSOR WHEELS HAVING A BI-LAYERED COATING AND METHODS FOR MANUFACTURING THE SAME

TECHNICAL FIELD

The present disclosure generally relates to turbocharger components and methods for manufacturing turbocharger components. More particularly, the present disclosure relates to turbocharger compressor wheels having a bi-layered coating of an electroless nickel-phosphorous base layer and a hard chrome top layer, and methods for manufacturing the same.

BACKGROUND

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine wheel to spin within the housing. The exhaust gas-driven turbine wheel is mounted onto one end of a shaft that is common to a radial air compressor mounted onto an opposite end of the shaft and housed in a compressor housing. Thus, rotary action of the turbine wheel also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In recent years, there has been increasing pressure in the form of governmental legislation to reduce internal combustion engine emissions, such as $NO_x$ and particulate matter (PM). Oxides of nitrogen ($NO_x$) may be formed when temperatures in the combustion chamber are about 2500° F. or hotter. At these elevated temperatures, the nitrogen and oxygen in the combustion chamber may chemically combine to form nitrous oxides.

Exhaust gas recirculation (EGR) is a method that has been used to reduce the level of $NO_x$ in exhaust gases. In EGR systems, some of the exhaust gases that would otherwise be discharged into environment are recirculated into the intake stream. The recirculated exhaust gases have already combusted and have a significantly lower oxygen content, so they do not burn again when they are recirculated. The exhaust gases may displace some of the normal intake charge. As a result, the combustion process may be cooler by several hundred degrees so that $NO_x$ formation may be reduced.

The use of EGR, however, results in an increased amount of water that is condensed out of the recirculated exhaust gasses. The amount of water that is condensed may depend, for example, on temperature, humidity, and operating speed of the engine. If condensed water droplets impact the spinning compressor wheel, an erosive effect may be observed over time. As a result, the components may prematurely fail.

To overcome this problem, some turbocharger manufacturers have developed compressor stage components, such as the compressor wheel, made of titanium alloy. However, the use of titanium may not be desirable for several reasons. First, titanium is substantially more expensive than aluminum and is more difficult to work with, thus increasing the costs of producing the turbocharger unit. Second, titanium is heavier than aluminum and thus increases the rotational inertia of the compressor wheel. As a result, the turbocharger may be less responsive than an otherwise equivalent unit employing an aluminum wheel.

Accordingly, it would be desirable to provide turbocharger compressor wheels that are able to withstand the erosive effects of water droplets, without requiring the use of heavier and more expensive materials such as titanium. Furthermore, it would be desirable to provide such turbocharger compressor wheels that are able to be manufactured easily with existing technologies that do not result in significant additional manufacturing complexity or expense. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbocharger compressor wheels having a bi-layered coating of an electroless nickel-phosphorous base layer and a hard chrome top layer, and methods for manufacturing the same, are disclosed herein.

In an exemplary embodiment, a compressor wheel for a turbocharger includes a hub portion defining a rotational axis and a plurality of blades extending radially outward from the hub portion. Each blade of the plurality of blades includes a leading edge, the leading edges of each blade of the plurality of blades forming an inducer portion of the compressor wheel. Each blade of the plurality of blades further includes a trailing edge, the trailing edges of each blade of the plurality of blades forming an exducer portion of the compressor wheel. The inducer portion is positioned longitudinally forward from the exducer portion along a rotational axis with respect to a flow of air along the compressor wheel. The hub portion and the plurality of blades include a substrate metal. The substrate metal of the hub portion and the plurality of blades is coated directly thereon a first coating layer including electroless nickel-phosphorous. The first coating layer is coated directly thereon a second coating layer including hard chrome. The second coating layer has a thickness that is greatest at the inducer portion, with the thickness of the second coating layer decreasing rearward towards the exducer portion such that the thickness of the second coating layer is about zero microns at or longitudinally forward of the trailing edges of each blade of the plurality of blades.

In another exemplary embodiment, a method for manufacturing a bi-layer coated compressor wheel for a turbocharger includes the step of providing or obtaining a substrate compressor wheel. The substrate compressor wheel includes a hub portion defining a rotational axis and a plurality of blades extending radially outward from the hub portion. Each blade of the plurality of blades includes a leading edge, the leading edges of each blade of the plurality of blades forming an inducer portion of the compressor wheel. Each blade of the plurality of blades further includes a trailing edge, the trailing edges of each blade of the plurality of blades forming an exducer portion of the compressor wheel. The inducer portion is positioned longitudinally forward from the exducer portion along a rotational axis with respect to a flow of air along the compressor wheel. The hub portion and the plurality of blades include a substrate metal. The method further includes the step of forming on the substrate metal of the hub portion and the plurality of blades a first coating layer including electroless nickel-phosphorous. Forming the first coating layer includes immersing the substrate compressor wheel in an electroless nickel-phosphorous plating bath including nickel cations and phosphorous oxide anions. Still further, the method includes the step of forming on the first coating layer a second coating layer including hard chrome. The second coating layer has a thickness that is greatest at the inducer portion, the thickness of the second coating layer decreasing rearward towards the exducer portion such that the thickness of the second coating layer is about zero microns at or longitudinally forward of the trailing edges of each blade of the plurality of blades. Forming the second coating layer includes immersing the compressor wheel coated with the first coating layer in a chromium plating bath including an oxide of chromium and an acid of sulfur, and applying an electric current using an anode and a cathode, with the compressor wheel coated with the first coating layer functioning as the cathode. The inducer portion is oriented facing the anode in the chromium plating bath.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

The inventive subject matter will hereinafter be described in conjunction with the following drawing figures, wherein like numerals denote like elements, and wherein.

DETAILED DESCRIPTION

Figure 1:
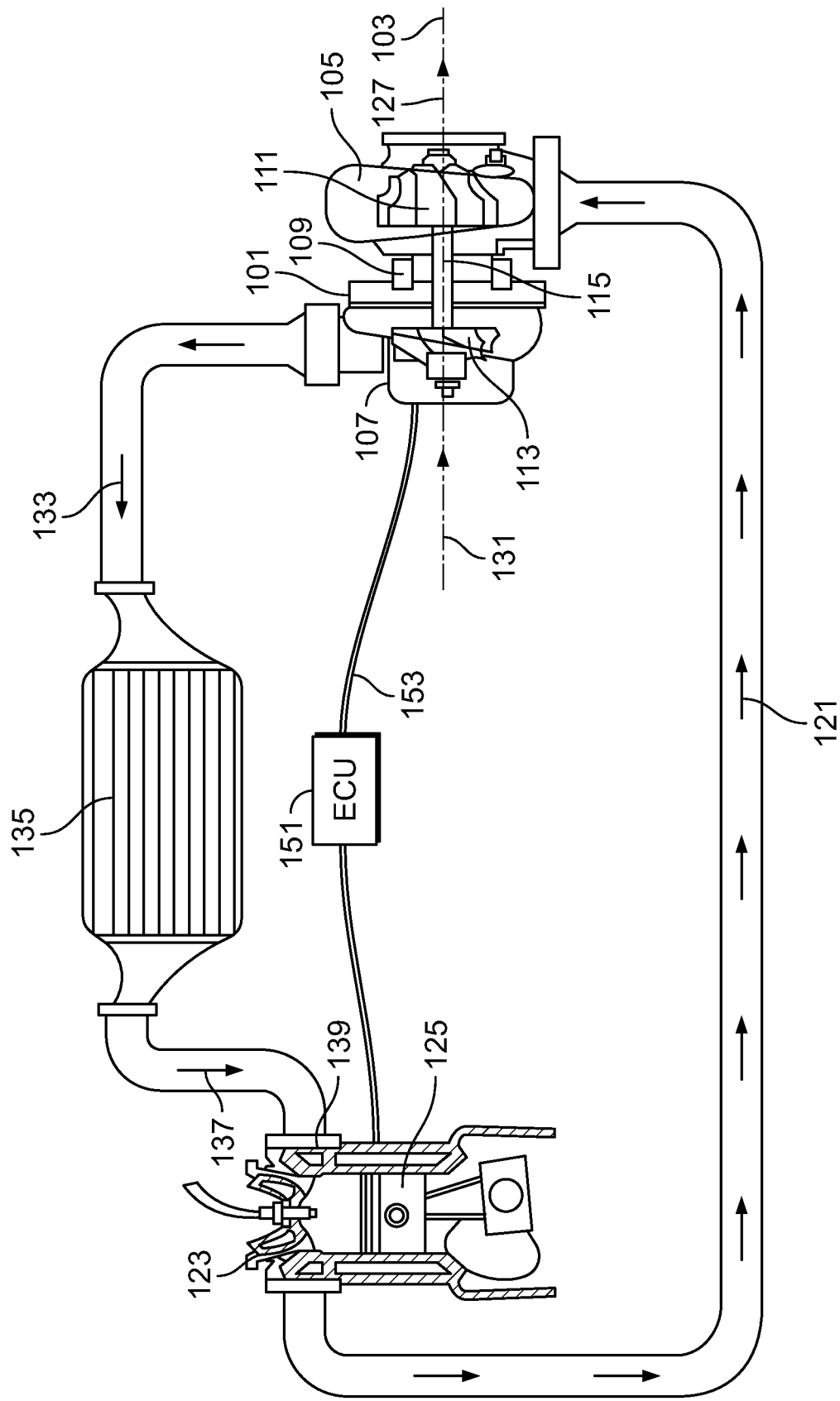
FIG. 1 is a system view of an exemplary internal combustion engine including a turbocharger in accordance with some embodiments of the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

The present disclosure is generally directed to turbocharger compressor wheels having a bi-layered coating of an electroless nickel-phosphorous base layer and a hard chrome top layer, and methods for manufacturing the same. In particular, the present disclosure addresses the aforementioned erosion problem with the use of electroless nickel-phosphorus as a base layer followed by a hard chrome top layer. The purpose of the electroless nickel-phosphorous layer as a base layer is to minimize the difference in hardness between the relatively hard chrome top layer and the relatively soft aluminum substrate. That is, a hard chrome top layer disposed directly on the soft aluminum substrate could potentially fail in service due to the poor combination of mechanical strength.

The present disclosure utilizes a relatively high phosphorus content (for example, greater than or equal to about 10 wt-%) electroless nickel-phosphorous coating as the base coating. The combination of a relatively high phosphorus content and controlled process parameters ensures a compressive residual stress in the coating that will help to reduce failures of the compressor wheel due to fatigue. The aforesaid base layer of electroless nickel-phosphorous covers the entire compressor wheel, with the exception of several functional regions for reasons of manufacture/assembly. The functional regions not requiring the coating are masked during the process.

To provide additional hardness, the aforesaid hard chrome layer is employed, which has a hardness greater than about 800 HV, or greater than about 900 HV. In accordance with the present disclosure, the hard chrome layer is provided only on inducer/leading edge region of compressor wheel, using electrochemical deposition techniques. This selective provision is achieved by positioning the compressor wheel in an electrochemical cell in a manner such that the leading edge faces the anodic surface. The ionic flow in the electrolyte is thus focused towards the leading edges. The chrome deposition process is performed such that the thickness of the chrome coating is greatest at the leading edges (for example, a thickness from about 5 to about 25 microns) and then gradually decreases (in a tapering manner) towards the back-disc of the compressor wheel. Erosion from water droplets has been found to be greatest at the leading edges. At the fillet root, which is the area of maximum stress during operation, the thickness is reduced to about 0 microns, such that the effect of tensile stresses caused by the additional of the hard chrome coating layer is effectively eliminated at those locations.

With reference now to FIG. 1, illustrated is a turbocharger 101 in accordance with the present disclosure having a radial turbine and that includes a turbocharger housing and a rotor configured to rotate within the turbocharger housing along an axis of rotor rotation 103 on thrust bearings and two sets of journal bearings (one for each respective rotor wheel), or alternatively, other similarly supportive bearings. The turbocharger housing includes a turbine housing 105, a compressor housing 107, and a bearing housing 109 (i.e., a center housing that contains the bearings) that connects the turbine housing 105 to the compressor housing 107. The rotor includes a turbine wheel 111 located substantially within the turbine housing 105, a compressor wheel 113 located substantially within the compressor housing 107, and a shaft 115 extending along the axis of rotor rotation 103, through the bearing housing 109, to connect the turbine wheel 111 to the compressor wheel 113.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel 111 (and thus the rotor) is driven in rotation around the axis of rotor rotation 103 by the high-pressure and high-temperature exhaust gas stream 121, which becomes a lower-pressure and lower-temperature exhaust gas stream 127 and is axially released into an exhaust system (not shown).

The compressor housing 107 and compressor wheel 113 form a compressor stage. The compressor wheel 113, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature over that of the input air.

Optionally, the pressurized air stream may be channeled through a convectively cooled charge air cooler 135 configured to dissipate heat from the pressurized air stream 133, increasing its density. The resulting cooled and pressurized output air stream 137 is channeled into an intake manifold 139 on the internal combustion engine, or alternatively, into a subsequent-stage, in-series compressor. The operation of the system is controlled by an engine control unit (ECU) 151 that connects to the remainder of the system via communication connections 153.

Figure 2:
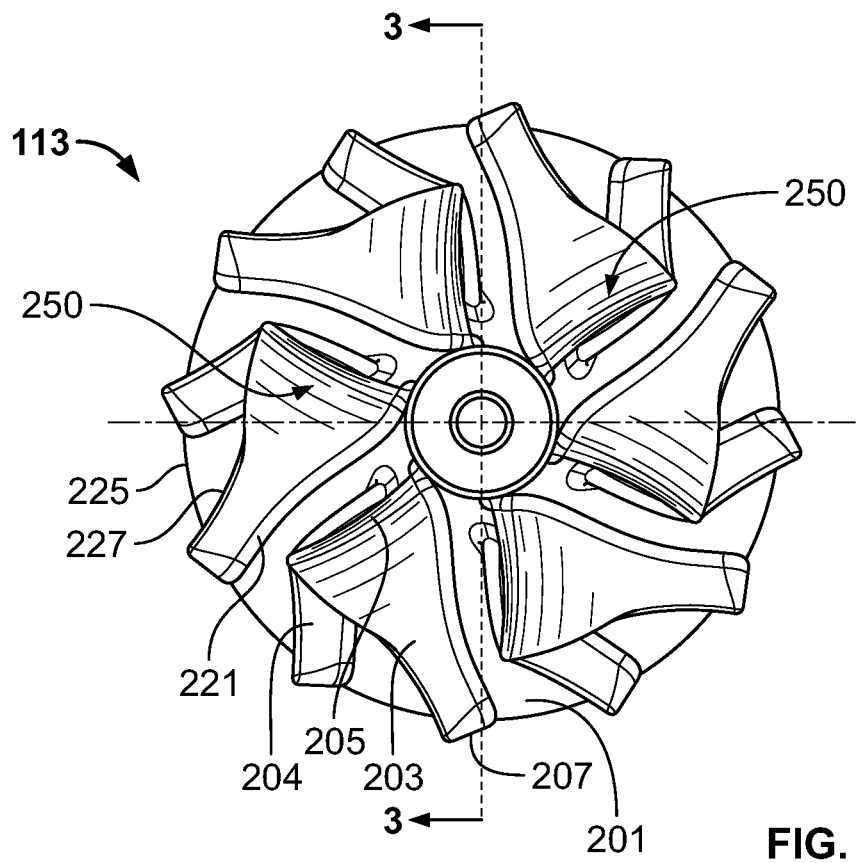
FIG. 2 is a front view of a compressor wheel, as used in the turbocharger of FIG. 1.
Figure 3:
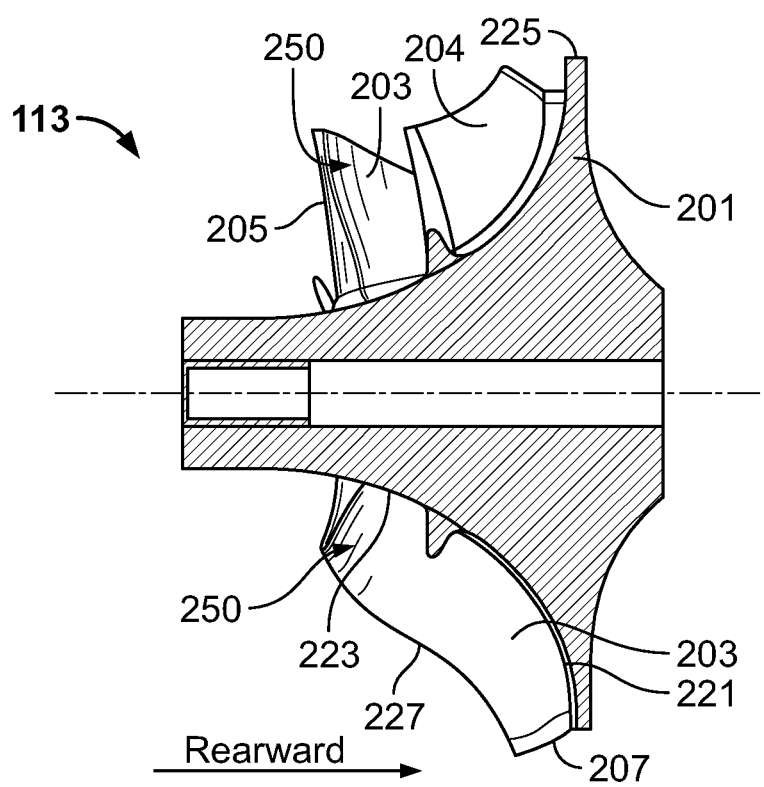
FIG. 3 is a right side cross-section view of the compressor wheel depicted in FIG. 2.
Figure 4:
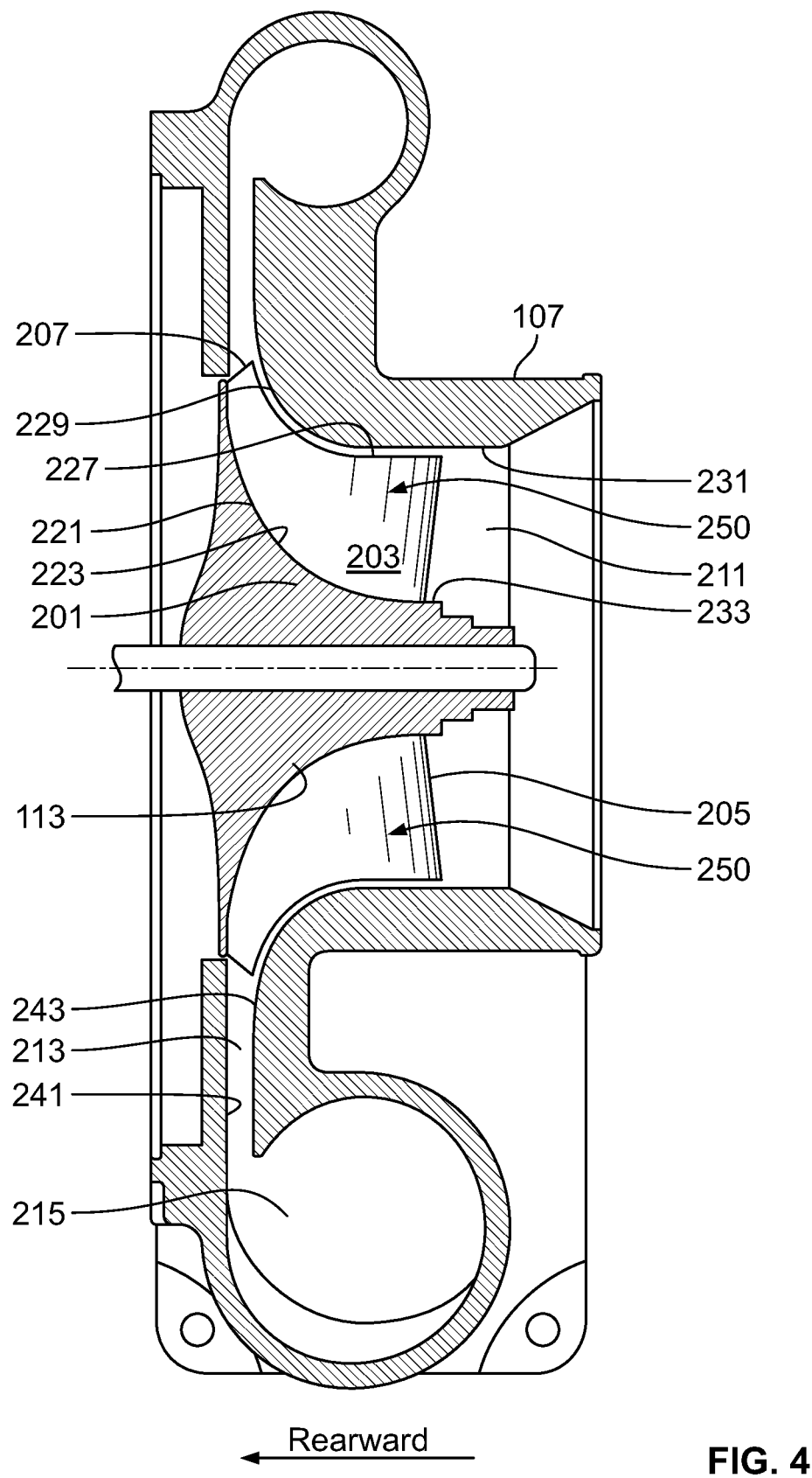
FIG. 4 is a left side cross-section view of a compressor stage, as is used in the turbocharger of FIG. 1, with its main blades projected onto the plane of the page in a full meridional view.

With further reference now to FIGS. 2-4, the compressor wheel 113 is a radial compressor wheel that includes a hub 201 and a plurality of blades, including a plurality of main blades 203 and optionally a plurality of splitter blades 204. The blades have a backward curvature (i.e., a back swept angle wherein the wheel exit blade angle is backward swept circumferentially relative to a radial line and the leading edges of the blades lead the trailing edges of the blades when the hub is rotated to compress air) rather than being configured to extend in a purely radial blade configuration. Each main blade 203 has a leading edge 205 that defines the beginning of an inducer (i.e., an intake area for the combined set of main blades, extending through the circular paths of roughly the upstream ⅓ of the main blades), and a trailing edge 207 that defines the end of an exducer (i.e., a typically annular output area for the combined set of main blades, extending through the circular paths of roughly the downstream ⅓ of the main blades). Alternative embodiments may include compressor wheels without splitter blades (i.e., with main blades only).

The compressor housing 107 and compressor wheel 113 form a compression-air passageway, serially including an intake duct 211 leading axially into the inducer, an impeller passage leading from the inducer through the exducer and substantially conforming to the space through which the main blades rotate, a diffuser 213 leading radially outward from the exducer, and a volute 215 extending around the diffuser. The volute forms a scroll shape and leads to an outlet port through which the pressurized air stream is ejected circumferentially (i.e., normal to the radius of the scroll at the exit) as the pressurized air stream 133 that passes to the (optional) charge air cooler and intake manifold. As is typical in automotive applications for a single stage turbo charging system, the intake duct is fed a stream of filtered external air from an intake passage in fluid communication with the external atmosphere. Each portion of the compression-air passageway is serially in fluid communication with the next. Alternative embodiments may include other types of turbo charging systems, such as two-stage turbochargers configured such that the air compressed by a first stage is used as the intake air of a second stage.

A hub edge 221 of each main blade 203 connects to the hub 201 on a hub wall 223 that extends along one side of an impeller passage from the upstream edge of the inducer to the outermost portion 225 of the hub that delimits the compression air passageway, which typically is substantially at the outer radial limit of the hub edge of the main blade (i.e., the hub edge of the main blade extends substantially to an outer radial limit of the hub wall). The hub edge of each main blade defines a three-dimensional curve along which the main blade connects to the hub at the hub wall. This may be curved both because of the axial-to-radial curvature of the hub wall and because of the backward curvature of the main blades. Opposite the hub edge of each main blade is a shroud edge 227, which also forms a curve, and which substantially conforms to a shroud wall 229 of the compressor housing 107.

The intake duct 211 of this embodiment defines a cylindrical shroud-side inlet wall portion 231 extending axially to the inducer, the shroud-side inlet wall portion being integral with, the extension of, and smoothly transitioned to (i.e., extending at the same axial-to-radial angle and aligned with) the shroud wall 229 at the upstream end of the impeller passage. In some embodiments the hub wall 223 may be configured such that the hub-side of the impeller passageway at the upstream end of the impeller passageway is substantially cylindrical, and parallel to the wheel axis of rotation, but in the other embodiments it may be at least slightly angled from the axis of rotation. The hub 201 defines a hub-side inlet wall portion 233 extending to the inducer, the hub-side inlet wall portion being integral with, the extension of, and smoothly transitioning to the hub wall 223.

The diffuser 213 defines a hub-side diffuser wall portion 241 (that may or may not be planar and normal to the axis of rotation 103) around the outer radial limit of the hub wall, and a shroud-side diffuser wall portion 243 that is integral with, and the extension of, the shroud wall 229 through the diffuser. The hub 201 is configured such that the hub-side of the impeller passageway at the outer radial limit of the hub wall is smoothly transitioned to (i.e., extending at the same axial-to-radial angle, and aligned with) the hub-side diffuser wall portion (which also may or may not be planar and normal to the axis of rotation). Likewise, the shroud-side diffuser wall portion smoothly transitions from (i.e., it extends at the same axial-to-radial angle and is aligned with) the shroud wall. Embodiments may have various configurations, e.g., wherein the hub-side of the impeller passageway at the outer radial limit of the hub wall is or is not planar and is or is not substantially normal to the wheel axis of rotation.

The compressor wheel 113 may be formed from aluminum (or an aluminum alloy) as the substrate. The compressor wheel 113 is provided with a first (base) coating layer on and overlying the substrate including electroless nickel-phosphorous. The phosphorous content of the first coating layer may be greater than or equal to about 10 wt.-%, for example from about 10 wt.-% to about 15 wt.-%, such as from about 11 wt.-% to about 15 wt.-%, or about 12 wt.-% to about 15 wt.-%. The thickness of the first coating layer may be from about 5 microns to about 30 microns, for example about 10 microns to about 30 microns. The first coating layer may be provided on all or most of the surfaces of the compressor wheel 113, both forward and rear facing (as such, the first coating layer is not provided with a separate reference numeral or delineation in the Figures). If the first coating layer is not provided on all of the surfaces, the surfaces not coated with the first coating layer may include functional surfaces, such as portions of the back-disc about the centerline (axis of rotation) or portions of the forward facing hub 233.

The compressor wheel 113 is provided with a second (top) coating layer 250 on and overlying portions of the first coating layer including hard chrome. The second coating layer has a thickness over the first coating layer that varies gradually (in a tapering manner) across the forward-facing surfaces of the compressor wheel 113 (including the main blades 203, the splitter blades 204 if present, the hub wall 223, and the hub-side inlet wall portion 233, for example). In an embodiment, the thickness of the second coating layer is greatest at the leading edges 205 and the shroud edges 227 adjacent to the leading edges 205. This greatest thickness may be from about 5 microns to about 25 microns, such as about 5 microns to about 15 microns. The thickness of the coating layer gradually decreases from the leading edges 205 rearwardly (along the axis of rotation) in the direction of the trailing edges 207. In embodiments, the thickness of the second coating 250 at the trailing edges is 0 or about 0 microns. In such embodiments, it is not necessary that the thickness reach 0 microns exactly at the trailing edges 207 as it decreases from the leading edges. Rather, the thickness of the second coating may reach 0 microns at any percentage of the overall distance rearwardly from the leading edges 205 to the trailing edges 207, for example from about 20% to about 80%, or about 30% to about 70%. The decreasing thickness in the rearward direction is illustrated in FIGS. 2-4 as the shading indicating layer 250 decreasing in density rearwardly.

Figure 5:
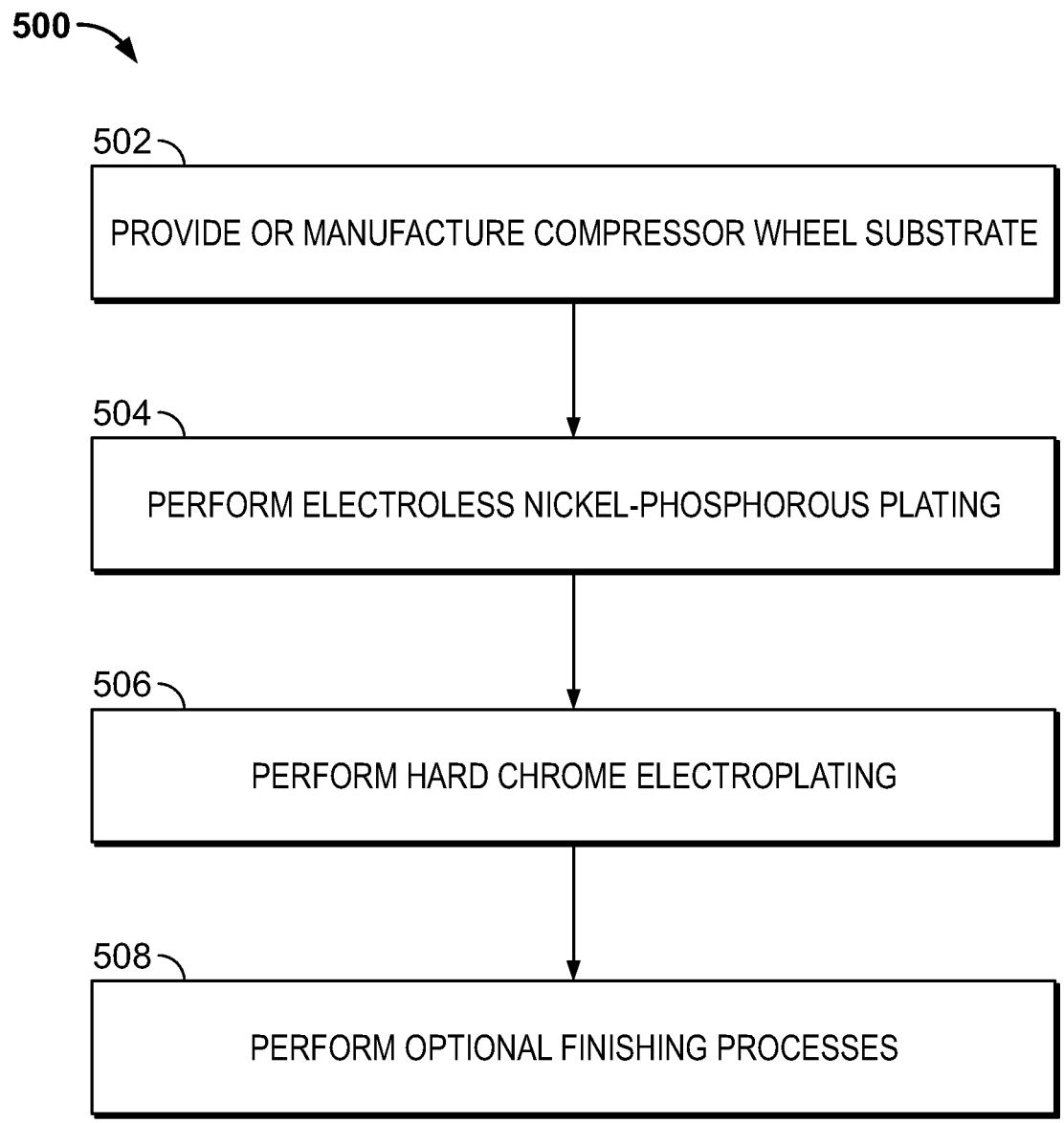
FIG. 5 is a flowchart illustrating a method for fabricating a compressor wheel in accordance with some embodiments of the present disclosure.

The compressor wheel 113 may be manufactured in accordance with a method 500 as illustrated in the flowchart shown in FIG. 5. The method 500 includes a step 502 of manufacturing or providing a compressor wheel made of aluminum (or alloy thereof) in the configuration shown in FIGS. 1-4, with the exception of the coating layers. The compressor wheel 113 may be manufactured using conventional manufacturing processes, such as casting and/or machining, or the like.

The method 500 continues with a step 504 of depositing forming a first (base) electroless nickel-phosphorous layer onto the compressor wheel (substrate). Electroless nickel-phosphorus plating is a chemical process that deposits an even layer of nickel-phosphorus alloy on the surface of the compressor wheel substrate. The process involves dipping the substrate in a water solution containing a nickel salt and a phosphorus-containing reducing agent, for example a hypophosphite salt. The concentration of the phosphorous-containing reducing agent is selected so as to achieve a phosphorous amount in the first layer greater than or equal to about 10 wt.-%, as described above. The reduction of the metal cations in solution to metallic form is achieved by purely chemical means, through an autocatalytic reaction. Before plating, the surface of the substrate may be cleaned. Cleaning may be achieved by a series of chemical baths, including non-polar solvents to remove oils and greases, as well as acids and alkalis to remove oxides, insoluble organics, and other surface contaminants. Further, functional portions of the substrate, as described above, may be optionally masked. Ingredients of the electroless nickel plating bath include a source of nickel cations $Ni^{2+}$, for example nickel sulfate and a suitable reducing agent, such as hypophosphite $H_2PO_3^-$. The plating bath may further include complexing agents, such as carboxylic acids or amines; stabilizers, such as lead salts or sulfur compounds; buffers; surfactants; and accelerators. The plating process is controlled with temperature and time to achieve a desired uniform thickness of about 20 to about 30 microns, as described above. Once Ni—P plating is complete, the substrate, now having the first layer plated thereon, may be rinsed to remove any residues from the plating process, and the masking (if any) may be removed.

Method 500 continues with a step 506 of electrochemically plating a second, hard chrome layer over the first Ni—P layer. Chrome plating provides a hard chrome layer, for example, greater than about 800 HV, or greater than about 900 HV, over the Ni—P layer. The chrome plating process may include an initial step of placing the Ni—P coated substrate in an activation bath, which may include chromic acid. The activation bath removes any scale that may have formed. Thereafter, the activated substrate is placed into a chromium bath, which may include a mixture of chromium trioxide ($CrO_3$) and sulfuric acid ($H_2SO_4$), the ratio of which may vary between about 75:1 and about 250:1, based on the desired process parameters. The temperature of the chromium bath may be from about 50 to about 65° C. during the plating process. As noted above, the desired configuration of the second layer is to provide a thickness over the first coating layer that varies gradually (in a tapering manner) across the forward-facing surfaces of the compressor wheel 113 such that the thickness of the second coating layer is greatest at the leading edges 205 and the shroud edges 227 adjacent to the leading edges 205, and the thickness of the coating layer gradually decreases from the leading edges 205 rearwardly (along the axis of rotation) in the direction of the trailing edges 207. This gradual reduction in thickness across the compressor wheel may be accomplished by positioning the compressor wheel in the chromium bath (electrochemical cell) in a manner such that the leading edges 205 (and the hub-side inlet wall portion 233) face the anodic surface of the electrochemical cell. In this manner, the ionic flow in the electrolyte is thus focused towards the leading edges 205. The plating process is controlled with temperature and time to achieve a desired greatest thickness of about 5 to about 25 microns, as described above. Once hard chrome plating is complete, the substrate, now having the second layer plated thereon, may be rinsed to remove any residues from the plating process.

The method 500 concludes with step 508, which may optionally include performing various finishing process, such as final cleaning, polishing, machining, heat treatment at temperatures of up to about 300° C. (for example from about 200° C. to about 300° C. or about 250° C. to about 300° C.) for time period of about 1 hour to about 4 hours, such as about 2 hours to about 4 hours, and others as conventionally known in the art. The result is a compressor wheel 113 in accordance with that described above in connection with FIGS. 2-4.

Accordingly, the present disclosure has provided turbocharger compressor wheels having a bi-layered coating of an electroless nickel-phosphorous base layer and a hard chrome top layer, and methods for manufacturing the same. The present disclosure has addressed the aforementioned erosion problem with the use of electroless nickel-phosphorus as a base layer followed by a hard chrome top layer, located in greatest thickness near the leading edges of the main blades.

As such, the turbocharger compressor wheels of the present disclosure are able to withstand the erosive effects of water droplets, without requiring the use of heavier and more expensive materials such as titanium. Moreover, the turbocharger compressor wheels disclosed herein are able to be manufactured easily with existing technologies, such as chemical deposition, that do not result in significant additional manufacturing complexity or expense.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A compressor wheel for a turbocharger, comprising:
a hub portion defining a rotational axis; and
a plurality of blades extending radially outward from the hub portion, wherein each blade of the plurality of blades comprises a leading edge, the leading edges of each blade of the plurality of blades forming an inducer portion of the compressor wheel, wherein each blade of the plurality of blades comprises a trailing edge, the trailing edges of each blade of the plurality of blades forming an exducer portion of the compressor wheel, the inducer portion being positioned longitudinally forward from the exducer portion along a rotational axis with respect to a flow of air along the compressor wheel,
wherein the hub portion and the plurality of blades comprise a substrate metal,
wherein the substrate metal of the hub portion and the plurality of blades has coated directly thereon a first coating layer comprising electroless nickel-phosphorous,
wherein the first coating layer has coated directly thereon a second coating layer comprising hard chrome, and
wherein the second coating layer has a thickness that is greatest at the inducer portion, the thickness of the second coating layer decreasing in a tapering manner rearward towards the exducer portion such that the thickness of the second coating layer is zero microns at or longitudinally forward of the trailing edges of each blade of the plurality of blades.

2. The compressor wheel of claim 1, wherein the substrate metal comprises aluminum or an alloy thereof.

3. The compressor wheel of claim 1, wherein the first coating layer comprising electroless nickel-phosphorous has a constant thickness across the hub portion and the plurality of blades from about 5 microns to about 30 microns.

4. The compressor wheel of claim 1, wherein the first coating layer comprising electroless nickel-phosphorous comprises a phosphorous content of about 10 wt.-% to about 15 wt.-%.

5. The compressor wheel of claim 1, wherein the second coating layer comprising hard chrome has a hardness of greater than about 800 HV.

6. The compressor wheel of claim 1, wherein the thickness of the second coating layer at the inducer portion is from about 5 microns to about 25 microns.

7. A method for manufacturing a bi-layer coated compressor wheel for a turbocharger, comprising:
providing or obtaining a substrate compressor wheel, wherein the substrate compressor wheel comprises:
a hub portion defining a rotational axis, and
a plurality of blades extending radially outward from the hub portion, wherein each blade of the plurality of blades comprises a leading edge, the leading edges of each blade of the plurality of blades forming an inducer portion of the substrate compressor wheel, wherein each blade of the plurality of blades comprises a trailing edge, the trailing edges of each blade of the plurality of blades forming an exducer portion of the substrate compressor wheel, the inducer portion being positioned longitudinally forward from the exducer portion along a rotational axis with respect to a flow of air along the substrate compressor wheel,
wherein the hub portion and the plurality of blades comprise a substrate metal;
forming on the substrate metal of the hub portion and the plurality of blades a first coating layer comprising electroless nickel-phosphorous, wherein forming the first coating layer comprises immersing the substrate compressor wheel in an electroless nickel-phosphorous plating bath comprising nickel cations and phosphorous oxide anions; and
forming on the first coating layer a second coating layer comprising hard chrome, wherein the second coating layer has a thickness that is greatest at the inducer portion, the thickness of the second coating layer decreasing in a tapering manner rearward towards the exducer portion such that the thickness of the second coating layer is zero microns at or longitudinally forward of the trailing edges of each blade of the plurality of blades, and wherein forming the second coating layer comprises immersing the compressor wheel coated with the first coating layer in a chromium plating bath comprising an oxide of chromium and an acid of sulfur, and applying an electric current using an anode and a cathode, the compressor wheel coated with the first coating layer functioning as the cathode, wherein the inducer portion is oriented facing the anode in the chromium plating bath.

8. The method of claim 7, further comprising performing a heat treatment step after forming the second layer comprising hard chrome.

9. The method of claim 8, wherein the heat treatment step is performed for a time period of about 1 hour to about 4 hours at a temperature of up to about 300° C.

* * * * *